(12) United States Patent
Gupta et al.

(10) Patent No.: US 11,327,749 B2
(45) Date of Patent: May 10, 2022

(54) SYSTEM AND METHOD FOR GENERATING DOCUMENTATION FOR MICROSERVICE BASED APPLICATIONS

(71) Applicant: Dell Products L. P., Round Rock, TX (US)

(72) Inventors: Shubham Gupta, Jaipur (IN); Rohan Sharma, Delhi (IN); Rangan Basu, Gurgaon (IN)

(73) Assignee: Dell Products L.P., Round Rock, TX (US)

( * ) Notice: Subject to any disclaimer, the term of this patent is extended or adjusted under 35 U.S.C. 154(b) by 379 days.

(21) Appl. No.: 16/683,450

(22) Filed: Nov. 14, 2019

(65) Prior Publication Data
US 2021/0149668 A1  May 20, 2021

(51) Int. Cl.
*G06F 9/44* (2018.01)
*G06F 8/73* (2018.01)
*G06F 9/54* (2006.01)

(52) U.S. Cl.
CPC ............... *G06F 8/73* (2013.01); *G06F 9/547* (2013.01)

(58) Field of Classification Search
None
See application file for complete search history.

(56) References Cited

U.S. PATENT DOCUMENTS

| 2014/0013304 A1* | 1/2014 | Vangala | G06F 8/75 717/123 |
| 2017/0012838 A1* | 1/2017 | Kashtan | G06F 8/73 |
| 2017/0075798 A1* | 3/2017 | Lau | G06F 8/73 |
| 2020/0133662 A1* | 4/2020 | Smith | G06F 8/73 |
| 2021/0133162 A1* | 5/2021 | Arnold | G06F 8/73 |

OTHER PUBLICATIONS

Newman et al., Automatically Generating Natural Language Documentation for Methods, IEEE, 2018 (Year: 2018).*

* cited by examiner

*Primary Examiner* — Insun Kang
(74) *Attorney, Agent, or Firm* — Krishnendu Gupta; Deepika Bhayana; Dorothy Wu Chiang

(57) ABSTRACT

A system of one or more computers that are configured to generate documentation for microservice-based applications is disclosed. In at least one embodiment, usage information relating to actual usage by one or more users of a plurality of microservices, features extracted from user story information in a backlog tracker, and a call-context graph including information identifying calling functions and called functions in the plurality of microservices are used to generate data that is provided to a natural language generator, which uses the information to automatically generate documentation for the microservice based application.

20 Claims, 9 Drawing Sheets

FIG. 2

SYSTEM AND METHOD FOR GENERATING DOCUMENTATION FOR MICROSERVICE BASED APPLICATIONS

BACKGROUND

Field of the Disclosure

The present disclosure relates to information handling systems. More specifically, embodiments of the disclosure relate to a system for generating documentation for microservice-based applications.

Description of the Related Art

As the value and use of information continues to increase, individuals and businesses seek additional ways to process and store information. Options available to users include information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information is processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

A system of one or more computers can be configured to perform particular operations or actions by virtue of having software, firmware, hardware, or a combination of them installed on the system that in operation causes or cause the system to generate documentation for microservice-based applications. One general aspect of the disclosure is directed to a computer-implemented method for generating documentation for microservice based application, where the microservice based application includes a plurality of microservices, including: accessing usage information relating to actual usage by one or more users of the plurality of microservices; accessing a backlog tracker including information relating to stories implemented by the plurality of microservices; extracting story feature information from the backlog tracker; accessing code for the plurality of microservices from a code repository; traversing the code from the code repository to generate a call-context graph, where the call-context graph includes information identifying calling functions and called functions in the code for the plurality of microservices; cross-matching the actual usage information and the information in the call-context graph to generate an aggregated output, where the aggregated output includes information relating to calling functions, called functions, and actual usage of the calling and called functions of the plurality of microservices; providing the story feature information and aggregated output to a natural language generator; and generating documentation for the microservice based application at the natural language generator using the story feature information and aggregated output. Other embodiments of this aspect include corresponding computer systems, apparatus, and computer programs recorded on one or more computer storage devices, each configured to perform the actions of the methods.

Another general aspect of the disclosure is directed to a system including: a processor; a data bus coupled to the processor; and a non-transitory, computer-readable storage medium embodying computer program code, the non-transitory, computer-readable storage medium being coupled to the data bus, the computer program code interacting with a plurality of computer operations and including instructions executable by the processor and configured for: accessing usage information relating to actual usage by one or more users of a plurality of microservices; accessing a backlog tracker including information relating to stories implemented by the plurality of microservices; extracting story feature information from the backlog tracker; accessing code for the plurality of microservices from a code repository; traversing the code from the code repository to generate a call-context graph, where the call-context graph includes information identifying calling functions and called functions in the code for the plurality of microservices; cross-matching the actual usage information and the information in the call-context graph to generate an aggregated output, where the aggregated output includes information relating to calling functions, called functions, and actual usage of the calling and called functions of the plurality of microservices; providing the story feature information and aggregated output to a natural language generator; and generating documentation for the microservice based application at the natural language generator using the story feature information and aggregated output.

Another general aspect of the disclosure is directed to a non-transitory, computer-readable storage medium embodying computer program code, the computer program code including computer executable instructions configured for: accessing usage information relating to actual usage by one or more users of the plurality of microservices; accessing a backlog tracker including information relating to stories implemented by the plurality of microservices; extracting story feature information from the backlog tracker; accessing code for the plurality of microservices from a code repository; traversing the code from the code repository to generate a call-context graph, where the call-context graph includes information identifying calling functions and called functions in the code for the plurality of microservices; cross-matching the actual usage information and the information in the call-context graph to generate an aggregated output, where the aggregated output includes information relating to calling functions, called functions, and actual usage of the calling and called functions of the plurality of microservices; providing the story feature information and aggregated output to a natural language generator; and generating documentation for the microservice based application at the natural language generator using the story feature information and aggregated output. Other embodiments of this aspect include corresponding computer systems, apparatus, and computer programs recorded on one or more computer storage devices, each configured to perform the actions of the methods.

BRIEF DESCRIPTION OF THE DRAWINGS

The present disclosure may be better understood, and its numerous objects, features and advantages made apparent to those skilled in the art by referencing the accompanying drawings. The use of the same reference number throughout the several figures designates a like or similar element.

FIG. 2 shows one example of a screenshot of an application that is employed to develop user stories.

DETAILED DESCRIPTION

Figure 1:
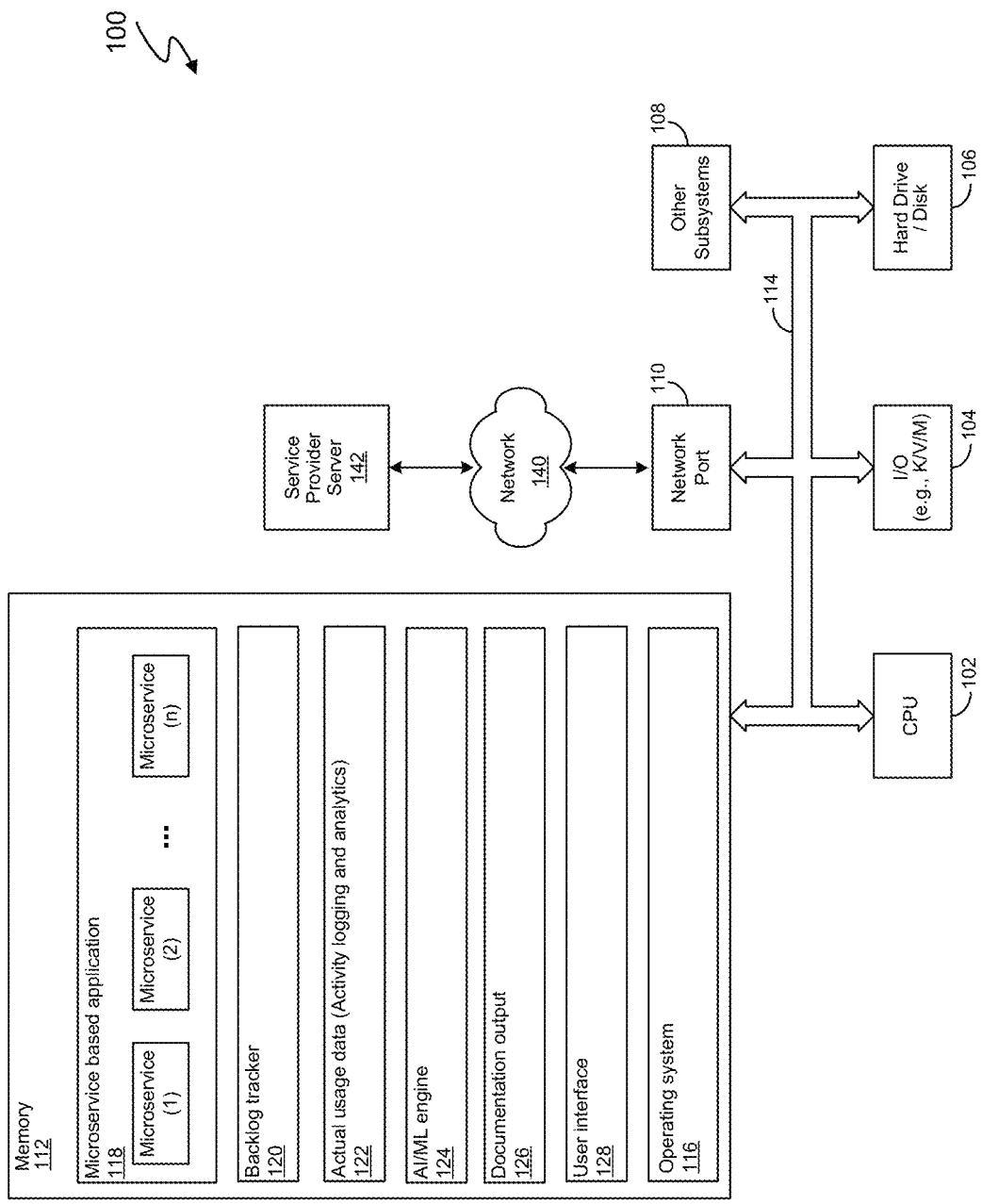
FIG. 1 is a generalized illustration of an information handling system that is configured to implement certain embodiments of the system and method of the present disclosure.

Microservice architectures are increasingly being used to deploy services in local and cloud-based information handling systems. A microservice is an independent, stand-alone capability designed as an executable or a process that communicates with other microservices through standard but lightweight interprocess communications such as Hypertext Transfer Protocol (HTTP), RESTful web services (built on the Representational State Transfer architecture), message queues, and the like. Microservices are unique when compared to standard monolithic applications in that each microservice is developed, tested, deployed, on-demand and independent of other microservices. Microservices are often deployed as container applications (such as, for example, Docker containers) that operate in a cluster under the management of a container orchestration system (such as, for example, Kubernetes, DockerSwarm, etc.).

A system, method, and computer-readable medium are disclosed for generating documentation for microservice based applications. The disclosed system takes a different approach to documentation solutions than those provided by existing solutions such as DocumentX, Ddoc, Doxygen, etc., which are tailored toward monolithic applications and fail to scale up to documentation for complex microservice applications. Certain embodiments of the disclosed system automatically generate application workflow documentation by referencing story details and user interaction with microservices of the microservice-based application thereby placing the primary focus of the documentation on the user's perspective. In certain embodiments, documentation may be generated for user flows that are segregated using different user personas catering to different user functions. In certain embodiments, the documentation is generated in a natural manner to timely reflect feature integrations in the microservice architecture of the microservice-based application.

In certain embodiments, usage information relating to actual use of a plurality of microservices of the microservice-based application by one or more users is employed. In certain embodiments, a backlog tracker is accessed, which includes information relating to stories implemented by the plurality of microservices. Story feature information is extracted from the backlog tracker. In certain embodiments, code for the plurality of microservices from a code repository is traversed to generate a call-context graph, which includes information identifying calling functions and called functions in the code. In certain embodiments, the depth of a function with respect to a root node is also extracted while traversing the code. In certain embodiments, an array is generated that includes all vertices and corresponding functions called while traversing the code. Further, in certain embodiments, a second array of parent functions, child functions, and the number of times the child function is called is also generated while traversing the code. In certain embodiments, the actual usage information and the information in the call-context graph are used to generate an aggregated output, which includes information relating to calling functions, called functions, and actual usage of the calling and called functions of the microservices. In certain embodiments, the aggregated output includes cross-matched information designed to ensure that the bad and/or non-traversed code is not considered for documentation. In certain embodiments, the story feature information and aggregated output are provided to a natural language generator, which generates documentation for the microservice-based application.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of non-volatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a generalized illustration of an information handling system 100 that is configured to implement certain embodiments of the system and method of the present disclosure. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140. In certain embodiments, the system may be accessible by a service provider server 142. The information handling system 100 likewise includes system memory 112, which is interconnected to the foregoing via one or more buses 114 or other suitable means. System memory 112 further comprises an operating system 116 and in various embodiments may also comprise other software modules and engines configured to implement certain embodiments of the disclosed system. Memory 112 may include memory that is accessed locally at the information handling system 100 and/or memory that is distributed amongst one or more memory devices, storage systems, and/or memory accessible at other information handling systems within a networked environment.

In the example shown in FIG. 1, memory 112 includes a microservice-based application 118 comprised of a plurality of microservices, shown here as Microservice (1) through (n), where n is an index corresponding to the number of microservices employed to implement the microservice-based application 118.

In the agile development of microservice-based applications, developers often employ user stories to ensure that the development of the microservices are focused on users of the microservice as opposed to code features. A user story is a short, simple description of a product feature from the perspective of the person who wants to use the feature, usually a user or customer of the product. User stories are usually in a behavioral-driven development format of GIVEN-WHEN-THEN. For example, a user story may be generated having a format following a simple template: As a <type of user >, I want <some goal> so that <some reason>. Tools available to generate and manage user stories include, for example, TFS, Pivotal Tracker, Github Tracker, etc.

Figure 2:
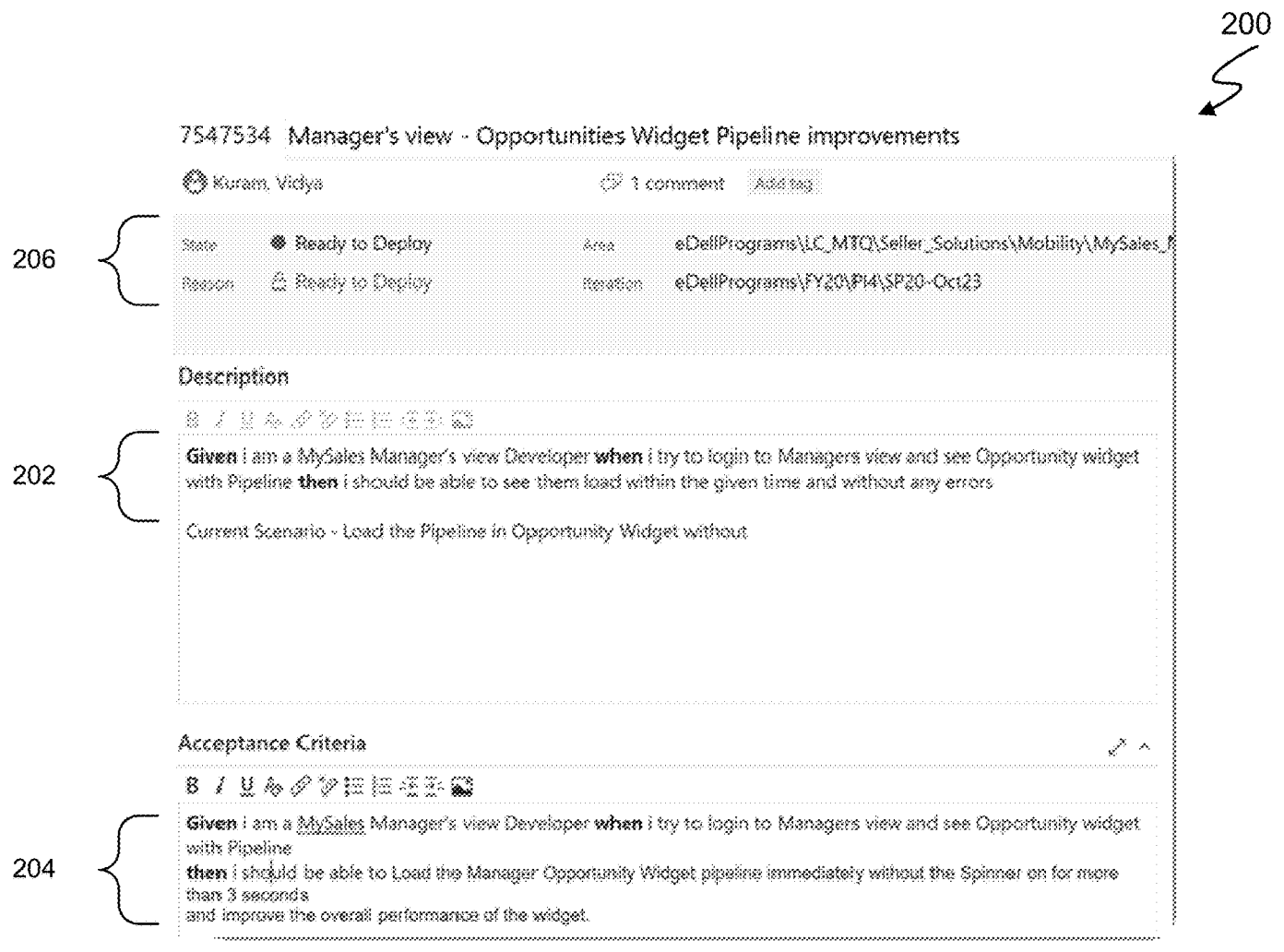

FIG. 2 shows one example of a screenshot 200 of an application that may be employed in the development and implementation of user stories. In this example, the user story is shown in the description text box 202. Here, the user is a MySales manager viewing a Developer. Per the user story, when the user tries to log in to the Manager's view and see an Opportunity widget with Pipeline, the MySales Manager should be able to see the Opportunity widget load within a given time and without errors. The acceptance criteria for the user story is shown in the acceptance criteria description text 204. The status of the deployment of the user story is shown in region 206. Here, the code implementing the user story is ready to be deployed. However, the information in region 206 may also indicate whether the code implementing the user story has actually been deployed, has not yet been deployed, has not yet been implemented, etc.

With reference again to FIG. 1, memory 112 also includes a backlog tracker 120. In certain embodiments, the backlog tracker 120 includes user stories that have been deployed, user stories that have been implemented but not deployed, user stories yet to be developed, and/or a prioritization of the user stories. In certain embodiments, users and features may be extracted from the backlog tracker 120 to generate the microservice documentation, as described herein.

Memory 112 may also include actual usage data 122, which provides information on how actual users engage the microservice-based application. In certain embodiments, the actual usage data may include activity logging and analytics information. In certain embodiments, the logging and analytics information includes one or more application log files, which include recorded events that are logged by microservices executed in the microservice-based application. The application log in certain embodiments contains error information, informational events and warnings reflecting the use of the microservices by one or more users. In certain embodiments, an application log file can reveal message flow issues and application problems. The application log file can also contain information about user and system actions that have occurred. In certain embodiments, logged events include: 1) warnings about low disk space; 2) information that a particular operation that has been carried out by an application; 3) error events (e.g., events that prevent the application from starting or other significant problems associated with running the application); and 4) security events (e.g., successful logging events, logon failures, the detected security breaches, etc.). In certain embodiments, application logs are stored and extracted using an application such as Kibana, App Insights, or other application suitable for accessing application logs.

In certain embodiments, the usage data 122 includes software analytics information. In certain embodiments, the analytics are specific to the domain of microservice-based application system, taking into account source code, static and dynamic characteristics (e.g., software metrics) as well as related processes of the development and evolution of the code. In certain embodiments, the analytics aim at describing, monitoring, predicting, and improving efficiency and effectivity of software engineering during microservice development and microservice maintenance. In certain embodiments, usage data 122 for analytics are obtained by collecting user actions or production data.

Certain embodiments of the disclosed system include an Artificial Intelligence/Machine Learning (AI/ML) engine 124. As described herein, the AI/ML engine 124 includes an intelligent natural language generator that accepts information derived from the backlog tracker 120, usage data 122, and a call context graph including information relating to calling and called functions. The AI/ML engine 124 generates a documentation output 126 that includes documentation for the microservice-based application in a format defined with the natural language generator. In certain embodiments, the documentation output 126 may be accessed through a user interface engine 128. In certain embodiments, the user interface engine 128 provides a means by which a developer can engage user story tools.

Figure 3:
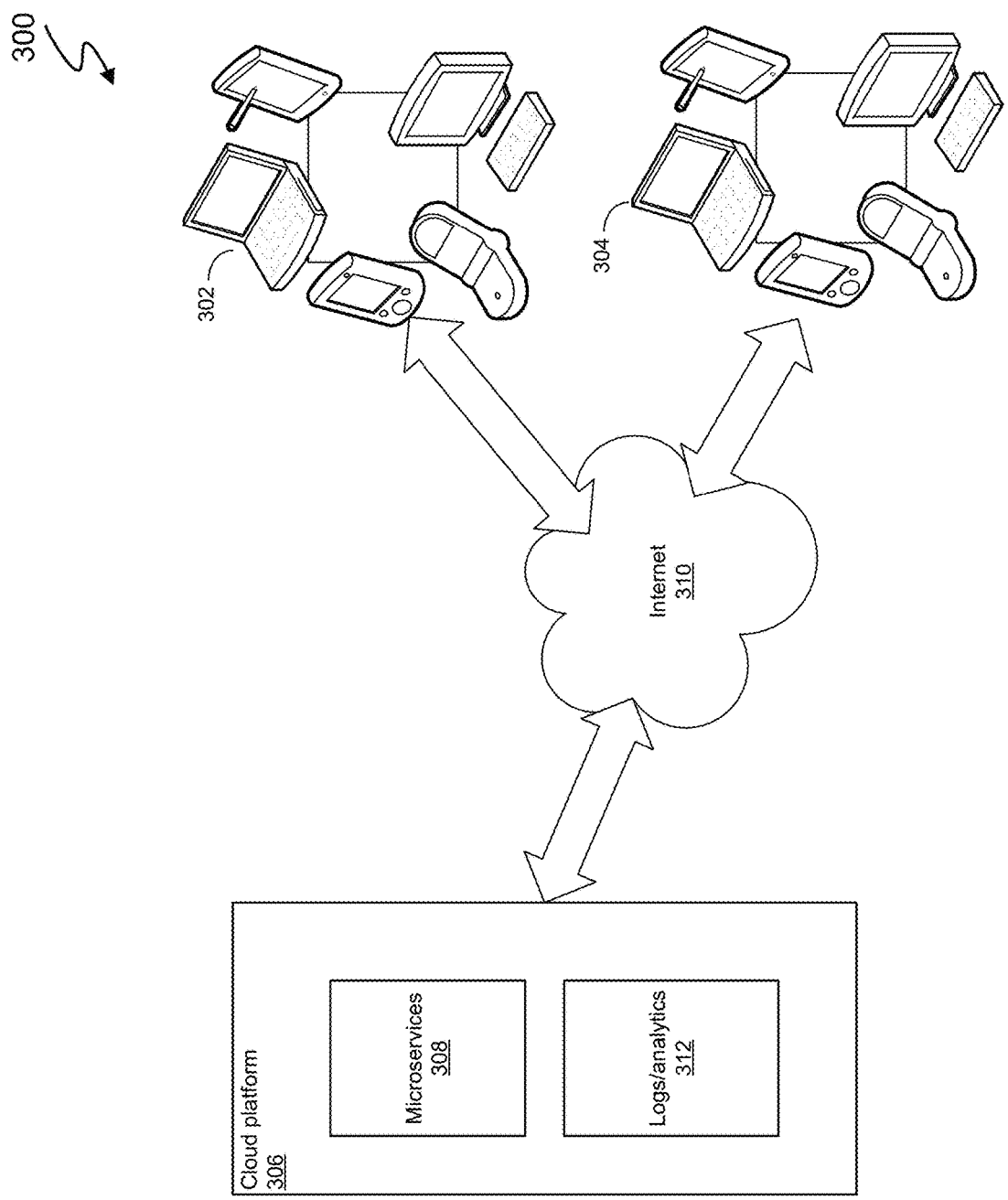
FIG. 3 shows an electronic environment in which a microservice-based application is consumed by a user.

FIG. 3 shows an electronic environment 300 in which a microservice-based application is consumed by a user. In this example, microservices 308 implementing the application are deployed on a cloud platform 306. Consumers of the micro services in this example access the microservices 308 using devices 302, 304 that communicate with the cloud platform 306 over a network, such as the Internet 310. In certain embodiments, application logs and/or analytics are employed to record information relating to the actual usage of the microservices 308 by the consumer.

Figure 4:
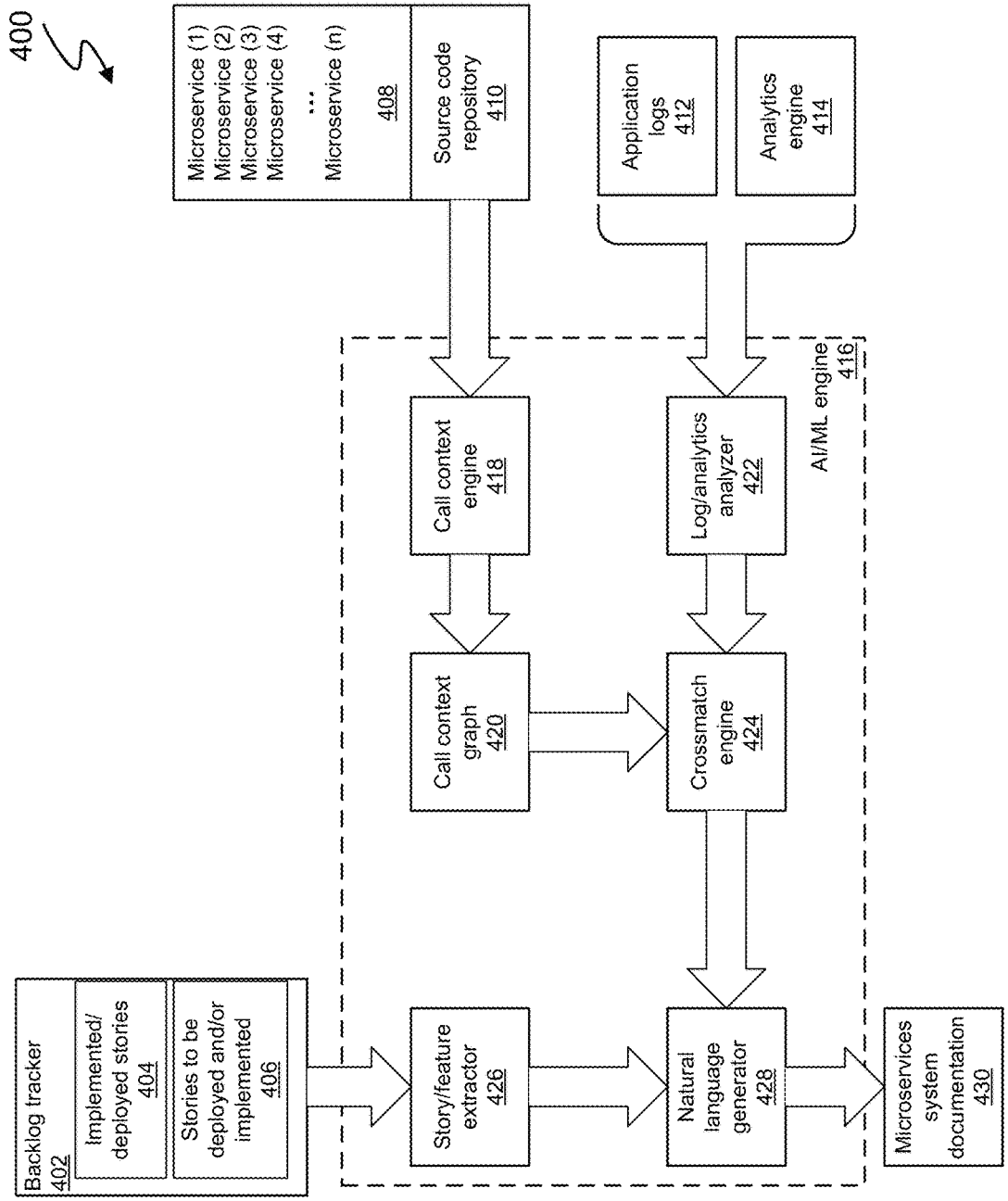
FIG. 4 shows one embodiment of a documentation system that is used to implement certain embodiments.

FIG. 4 shows one embodiment of a documentation system 400 that may be used to implement certain embodiments. In this example, the documentation system 400 includes a backlog tracker 402, which includes implemented/deployed stories 404, and stories that have yet to be deployed and/or implemented 406. The documentation system 400 is also configured to access code for a plurality of microservices 408 used to implement the microservice-based application. The code for the microservices 408 includes at least the code for a subset of microservices that are to be documented. In this example, the code for the microservices 408 is accessed at a source code repository 410.

Certain embodiments of the documentation system 400 includes information relating to the actual usage of the microservices 408 by one or more users. In this example, the information relating to actual usage is available from application logs 412 and an analytics engine 414.

FIG. 4 also shows an embodiment of an AI/ML engine 416 that may be employed in certain embodiments of the disclosed system. In this example, the AI/ML engine 416 accesses: 1) user story information from the backlog tracker 402; 2) code for the microservices 408; and 3) actual usage information derived from the application logs 412 and analytics engine 414. This data is processed and provided to a natural language generator to generate microservice system documentation 430.

In certain embodiments, the AI/ML engine 416 accesses user story information from the backlog tracker 402. The user story information in certain embodiments is provided to a story/feature extractor 426, which extracts features of the user stories. In certain embodiments, only stories having code that has been deployed are used for feature extraction to thereby limit the resources needed by the story/feature extractor. In certain embodiments, only stories having code that has been implemented, whether or not deployed, are used for feature extraction. In certain embodiments, all stories included in the backlog tracker 402 are used by the story/feature extractor 426 for feature extraction.

Certain embodiments provide the actual usage information from the application logs 412 and analytics engine 414 to a log/analytics analyzer 422. In certain embodiments, the log/analytics analyzer 422 processes the information from the application logs 412 and analytics engine 414 to provide output data relating to how actual users have interacted with the microservice-based application. In certain embodiments, the log/analytics analyzer 422 identifies errors occurring during user interaction. In certain embodiments, the log/analytics analyzer 422 provides information relating to the use of system resources when users interact with the microservice-based application.

The embodiment of the AI/ML engine 416 shown in FIG. 4 also includes a call context engine 418, which is configured to quickly and efficiently generate a call context graph 420 that identifies the traversed code paths in the microservices. The call context graph 420 includes information identifying calling functions and called functions in the code for the microservices 408. In certain embodiments, the call context graph 420 also includes vertex information indicative of the depth a function has with respect to a root node. In certain embodiments, the call context graph 420 also includes information relating to the number of times a called function is called by other functions. In certain embodiments, the call context graph 420 is used to limit documentation generation processing to calling and called functions while ignoring non-traversed and/or bad code.

The embodiment of the AI/ML engine 416 shown in FIG. 4 also includes a cross-match engine 424. In certain embodiments, the cross-match engine 424 accesses the actual usage information provided by the log/analytics analyzer 422 and the information in the call context graph 420 to generate an aggregated output. The aggregated output, in turn, is provided as input data to a natural language generator 428. The aggregated output from the cross-match engine 424 includes information relating to calling functions, called functions, and actual usage of the calling and called functions of the microservices 408. In certain embodiments, the cross-match engine 424 matches information about actual usage of the microservices with microservice functions identified in the call context graph 420. In certain embodiments, only information for microservice functions identified in the call context graph 420 are correlated with the corresponding actual usage information to generate the aggregated output thereby limiting the amount of data that the natural language generator 428 must process.

In certain embodiments, when the data provided to the natural language generator 428 is limited to microservices included in the call context graph, the processing resources needed by the natural language generator 428 to generate the microservices system documentation 430 are less than the processing resources needed by a natural language generator that analyzes all of the microservice code and usage information. In certain embodiments, the natural language generator 428 is implemented using an engine such as Automated Insight's Wordsmith Tool. However, it will be recognized based on the teachings of the present disclosure that other software tools that transform structured data into natural language may be employed in system 400.

Figure 5:
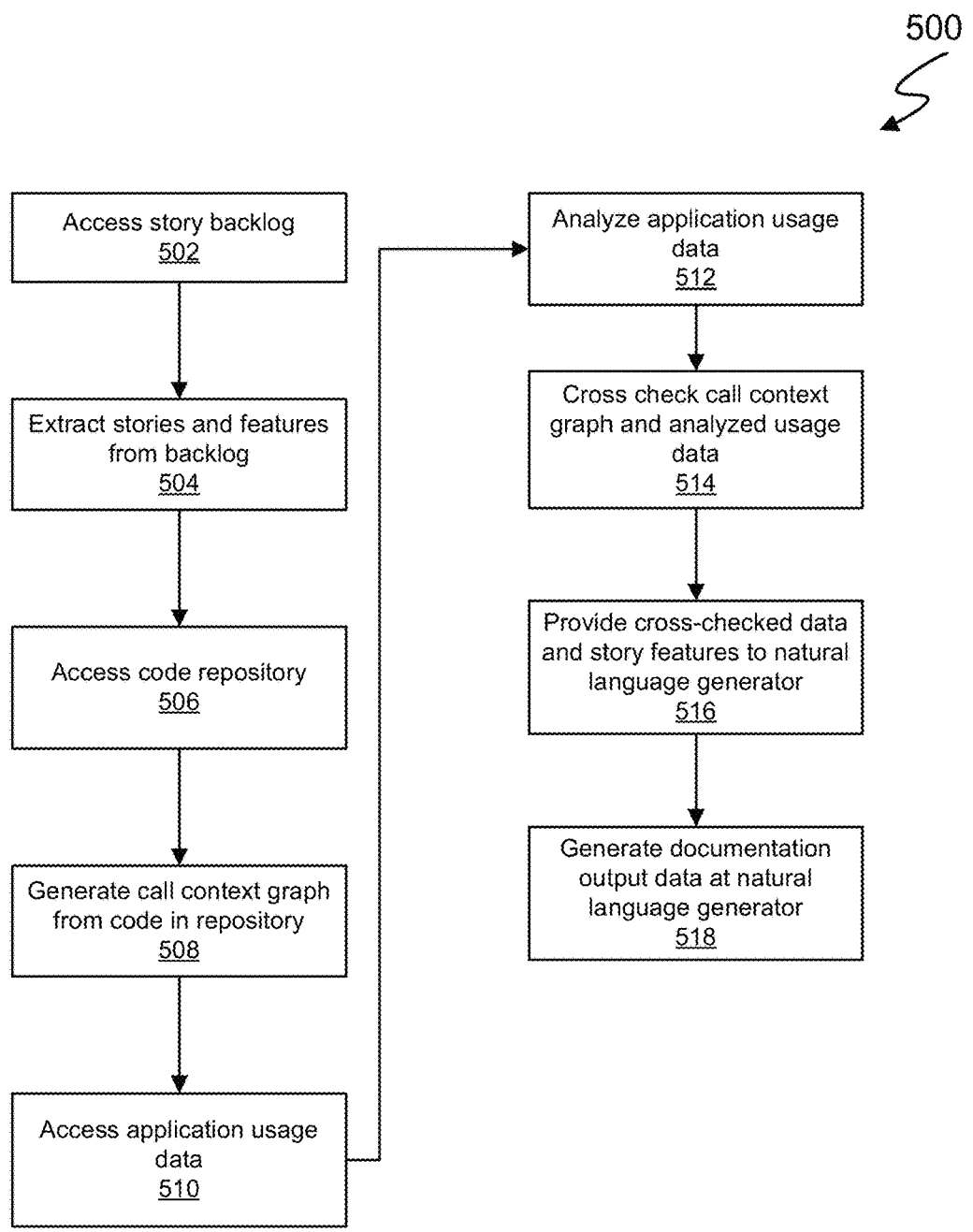
FIG. 5 is a flowchart depicting exemplary operations that may be executed in certain embodiments of the disclosed system.

FIG. 5 is a flowchart 500 depicting exemplary operations that may be executed in certain embodiments of the disclosed system. In this example, the story backlog is accessed at operation 502 and used to extract stories and features at operation 504. At operation 506, the microservice code in the code repository is accessed. The microservice code is traversed at operation 508 to generate a call context graph that identifies calling and called functions that are to be included in the microservice application documentation. In certain embodiments, the call context graph includes a first array of all vertices and corresponding functions called while traversing the code, and a second array of parent functions, child functions, and number of times the child function is called. In certain embodiments, each vertex in the first array corresponds to a depth of the corresponding functions from a root node.

At operation 510, certain embodiments access application usage data from, for example, application logs and system analytics systems. The application usage data is analyzed at operation 512. Certain embodiments analyze the application usage data to consolidate information from multiple sources and provide the information in a desired format for subsequent consumption by other portions of the AI/ML engine. In certain embodiments, the analysis at operation 512 includes manipulation of the usage data, aggregating the usage information, generating usage summary information, etc.

At operation 514, certain embodiments cross-check the call context graph with the analyzed usage data to provide an aggregated output that, for example, includes usage information for microservice functions found in the call context graph. User flow information may be derived from the aggregated output. In certain embodiments, the aggregated output is limited to usage information and microservice function information for microservice functions in the call context graph. In such embodiments, the aggregated output does not include information for microservices that are not included in the call context graph In certain embodiments, the cross-check data and story features are provided to the input of a natural language generator 516 to generate the documentation output data at operation 518. The natural language generator 516 is configured to generate textual paragraphs using a natural language generation process in which the engine is trained using the data from, for example, the backlog tracker. In certain embodiments, one feature can contain multiple stories which will form the knowledge bank for that feature in the natural language generation input dataset. A sample output from the natural language generator for the "Performance Improvement Feature" shown in FIG. 2 may be, for example: "When a user login to Managers view, he/she will immediately see Opportunity widget with Pipeline loaded within 3 seconds of time." Certain features may be more complicated than the features of the user story shown in FIG.

2. The reresultant output from the natural language generator for such features may be lengthier and more complex than described in present example.

Figure 6:
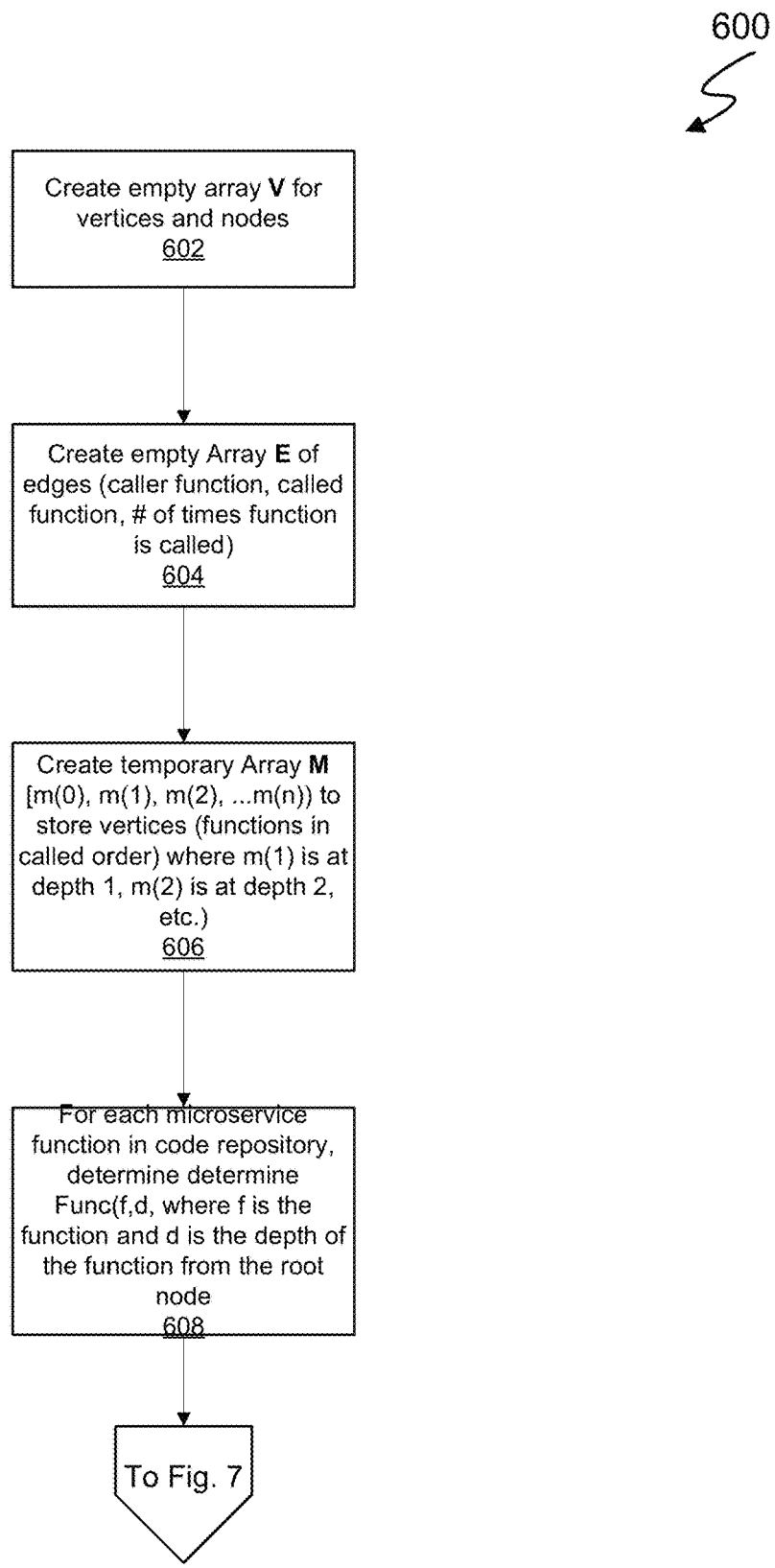
FIG. 6 is a flowchart showing exemplary operations that may be employed to generate a call context graph in certain embodiments of the disclosed system.
Figure 7:
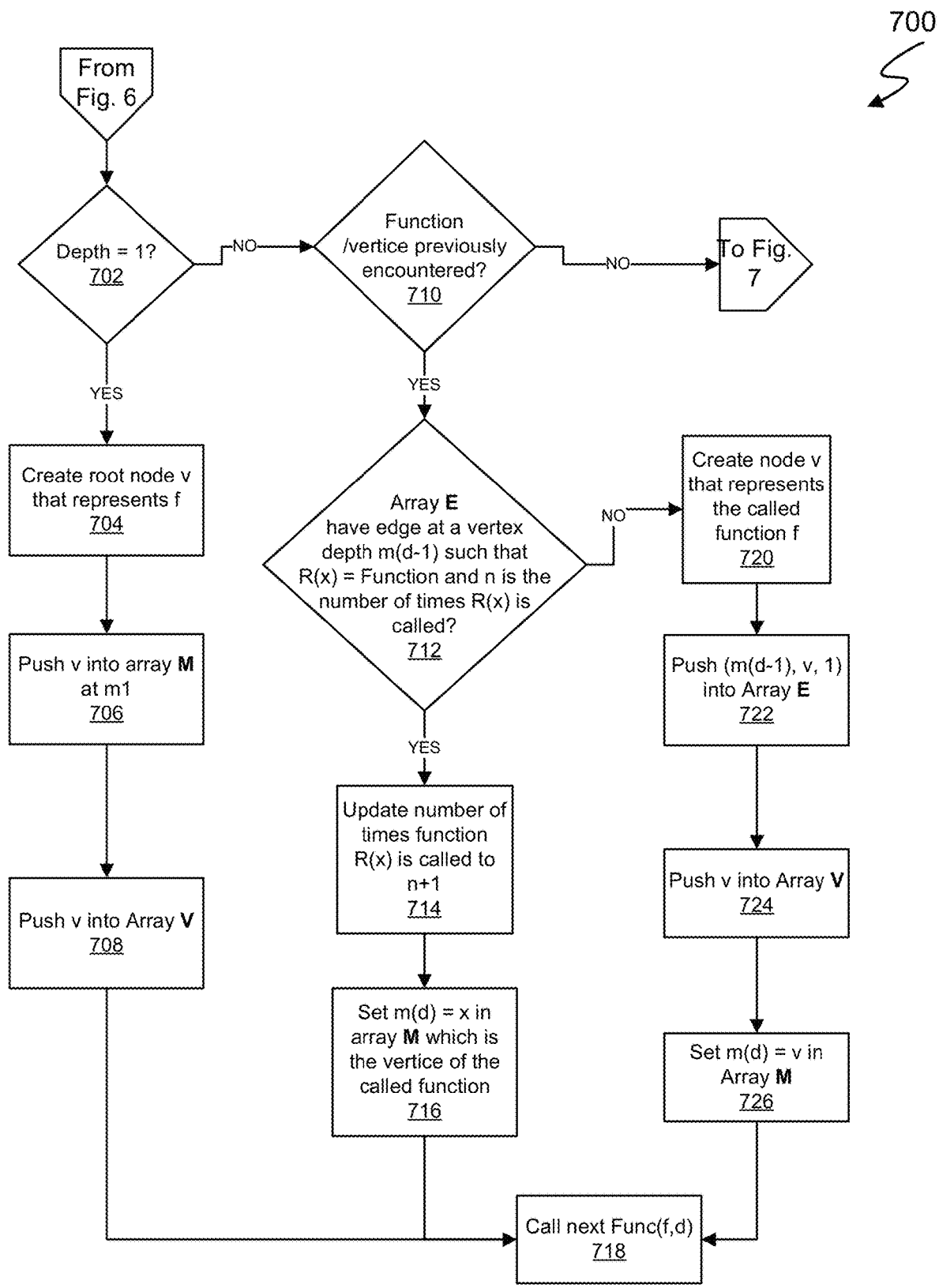
FIG. 7 is a flowchart of exemplary operations that may be executed to populate arrays of a call context graph with information when a traversed function is at a root node or a function/vertice has previously been encountered while traversing the code.
Figure 8:
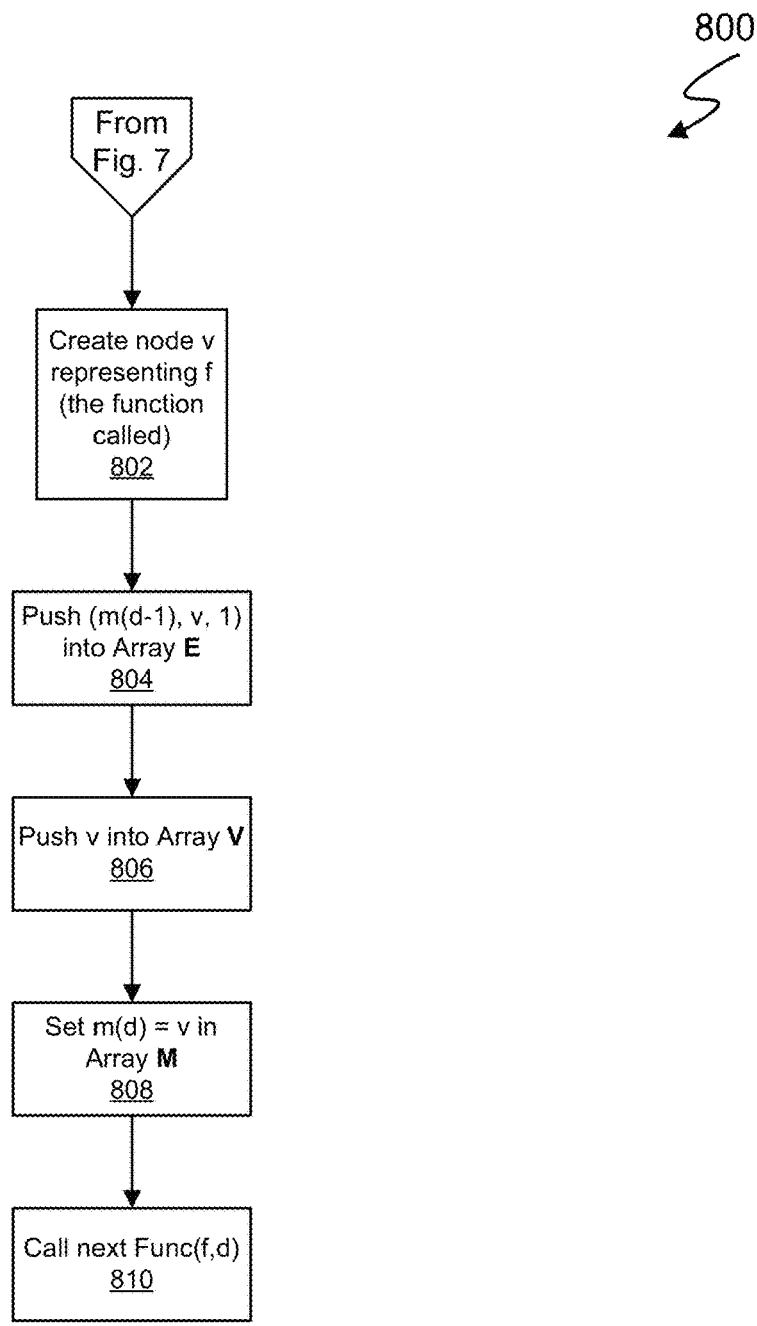
FIG. 8 is a flowchart depicting exemplary operations that may be executed to populate the arrays of a call context graph with information when the function is not at a root node, and the function/vertice has not previously been encountered.

FIG. 6 through FIG. 8 show exemplary operations that may be employed to generate a call context graph in certain embodiments of the disclosed system. With reference to the operations 600 shown in FIG. 6, an empty array V is created at operation 602, an empty array E is created at operation 604, and an empty array M is created at operation 606. The array V is intended to be populated by vertices and nodes, where a vertex is an identifier for a unique function. V is obtained from function signatures while traversing the codebase. The array E is intended to be populated with caller functions, called functions, and the number of times a called function is called while traversing the code. The array M is intended to be a temporary array that is created to store vertices (e.g. functions in called order), where m(0) is a root node, m(1) has a depth of 1 from the root, m(2) has a depth of 2 from the root node, etc.

At operation 608, a function Func(f,d) is executed as the main recursive function used to traverse all the functions f in the microservices-based application until the end of the code is encountered. The inputs are "f" as a particular function encountered and "d" is a depth of the function from the root node (e.g., the root function). Execution of Func(f,d) on all functions f of the microservice-based application results in sorted list of functions that are arrange according to the order the functions were called.

FIG. 7 is a flowchart 700 of exemplary operations that may be executed to populate the arrays with information when the traversed function is at a root node or the function/ vertice has previously been encountered while traversing the code. In this example, a determination is made at operation 702 as to whether the function is at a root node. The root node is the starting point or entry point of the overall microservice application. Generally, the main function of the microservices-based application is the root node v. A node representing the function f is created at operation 704 and pushed into array M at depth m(0), and also pushed into array V at operation 708 before the next function is called at operation 718.

If the function is not at a root node, a determination is made at operation 710 as to whether the function/vertex has been previously encountered while traversing the code. If the function/vertex has been previously encountered, array E is checked at operation 712 to determine whether there is an edge at a vertex depth m(d−1) such that R(x)=function and n is the number of times R(x) has been called. If the determination at operation 712 is affirmative, the number of times the function R(x) has been called is updated to n+1 at operation 714, and m(d) is set to x in array M, which is the vertices of the called function. After completion of operation 716, the next function in the microservice code is called at operation 718.

If the conditions at operation 712 are not met, a node v is created that represents the called function f at operation 720. The information for the function depth of the vertices for the function v is set to m(d−1), and the number of times the function has been called is set to 1. The information for the function (m(d−1), v, 1) is pushed into array E at operation 722. Node v is pushed into array M at depth m(d) at operation 726. After completion of operation 726, the next function is called at operation 718.

FIG. 8 is a flowchart 800 depicting exemplary operations that may be executed to populate the arrays with information when the function is not at a root node, and the function/ vertex has not previously been encountered. In this example, a function v representing the called function f is created at operation 802. At operation 804, the information (m(d−1), v,1) associated with the node v is pushed into array E and v is pushed into array V. At operation 808, m(d) is set to v in array M, and the next function that is to be traversed is called at operation 810.

Figure 9:
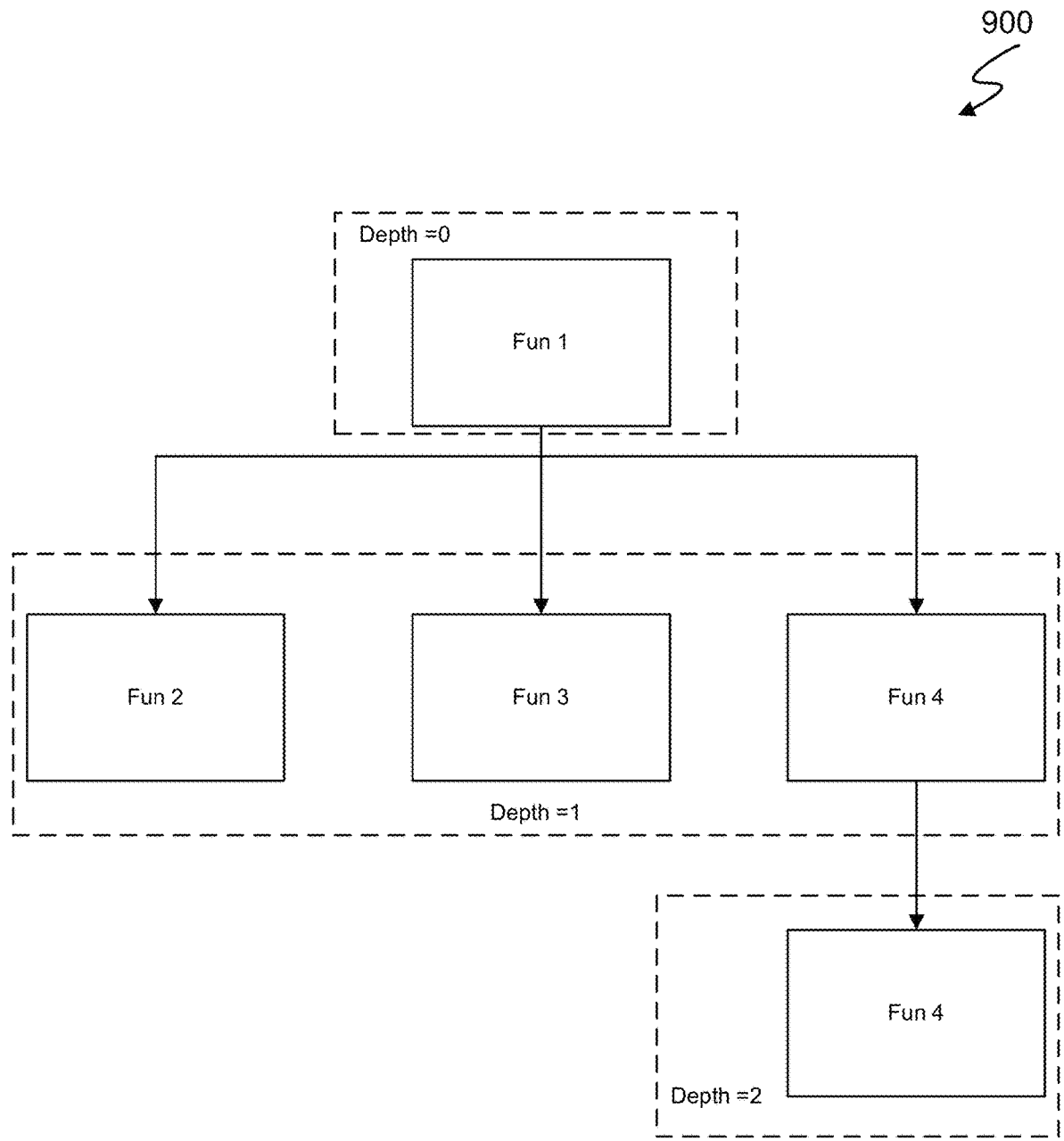
FIG. 9 is a diagram illustrating the relationship between exemplary functions that are found while traversing the microservices code.

FIG. 9 is a diagram 900 illustrating the relationship between exemplary functions that are found while traversing the microservices code. In this example, Fun2, Fun 3, and Fun 4 have a depth of 1. Fun 5 is shown with a depth of 2. Fun 1 is inserted in array V as the root node at m(0). When Fun 2 is called during the traversal of the microservice code, Func(Fun 2, 1) creates a child node v representing function Fun 2 is initialized as Fun 2, and Fun 2 is inserted in array M at m(1). Array M is subsequently filled at m(1) with Fun 3 and Fun 4 in called order. Since Fun 5 has no child nodes, Fun 5 is the ending point in the generation of the call-context graph.

Embodiments of the disclosure are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block or blocks.

The disclosed system is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

What is claimed is:

1. A computer-implemented method for generating documentation for microservice based application, wherein the microservice based application includes a plurality of microservices, comprising:

accessing usage information relating to actual usage by one or more users of the plurality of microservices;

accessing a backlog tracker including information relating to stories implemented by the plurality of microservices;

extracting story feature information from the backlog tracker;

accessing code for the plurality of microservices from a code repository;

traversing the code from the code repository to generate a call-context graph, wherein the call-context graph includes information identifying calling functions and called functions in the code for the plurality of microservices;

cross-matching the actual usage information and the information in the call-context graph to generate an aggregated output, wherein the aggregated output includes information relating to the calling functions, the called functions, and actual usage of the calling and called functions of the plurality of microservices;

providing the story feature information and aggregated output to a natural language generator; and generating documentation for the microservice based application at the natural language generator using the story feature information and aggregated output.

2. The computer-implemented method of claim 1, wherein
the story feature information is extracted from stories that have been implemented in the plurality of microservices to the exclusion of stories that have not been implemented in the plurality of microservices.

3. The computer-implemented method of claim 1, wherein
the aggregated output excludes actual usage information relating to functions that are not traversed in during generation of the call-context graph.

4. The computer-implemented method of claim 1, wherein
the usage information includes one or more electronic logs, wherein the one or more electronic logs include logged events occurring during user execution of the plurality of microservices, wherein the logged events are one or more of:
warnings about low disk space;
an operation that has been carried out;
error events; and
security events.

5. The computer-implemented method of claim 1, wherein
the usage information includes analytics data relating to actual usage of the plurality of microservices.

6. The computer-implemented method of claim 1, wherein
the call-context graph includes one or more of:
a first array of all vertices and corresponding functions called while traversing the code; and
a second array of parent functions, child functions, and number of times the child functions are called.

7. The computer-implemented method of claim 6, wherein
each vertice in the first array corresponds to a depth of the corresponding functions from a root node.

8. A system comprising:
a processor;
a data bus coupled to the processor; and
non-transitory, computer-readable storage medium embodying computer program code, the non-transitory, computer-readable storage medium being coupled to the data bus, the computer program code interacting with a plurality of computer operations and comprising instructions executable by the processor and configured for:
accessing usage information relating to actual usage by one or more users of a plurality of microservices;
accessing a backlog tracker including information relating to stories implemented by the plurality of microservices;
extracting story feature information from the backlog tracker;
accessing code for the plurality of microservices from a code repository;
traversing the code from the code repository to generate a call-context graph, wherein the call-context graph includes information identifying calling functions and called functions in the code for the plurality of microservices;
cross-matching the actual usage information and the information in the call-context graph to generate an aggregated output, wherein the aggregated output includes information relating to the calling functions, the called functions, and actual usage of the calling and called functions of the plurality of microservices;
providing the story feature information and aggregated output to a natural language generator; and
generating documentation for the microservice based application at the natural language generator using the story feature information and aggregated output.

9. The system of claim 8, wherein
the story feature information is extracted from stories that have been implemented in the plurality of microservices to the exclusion of stories that have not been implemented in the plurality of microservices.

10. The system of claim 8, wherein
the aggregated output excludes actual usage information relating to functions that are not traversed in during generation of the call-context graph.

11. The system of claim 8, wherein
the usage information includes one or more electronic logs, wherein the one or more electronic logs include logged events occurring during user execution of the plurality of microservices, wherein the logged events are one or more of:
warnings about low disk space;
an operation that has been carried out;
error events; and
security events.

12. The system of claim 8, wherein
the usage information includes analytics data relating to actual usage of the plurality of microservices.

13. The system of claim 8, wherein
the call-context graph includes one or more of:
a first array of all vertices and corresponding functions called while traversing the code; and
a second array of parent functions, child functions, and number of times the child functions are called.

14. The system of claim 13, wherein
each vertice in the first array corresponds to a depth of the corresponding functions from a root node.

15. A non-transitory, computer-readable storage medium embodying computer program code, the computer program code comprising computer executable instructions configured for:

accessing usage information relating to actual usage by one or more users of a plurality of microservices;

accessing a backlog tracker including information relating to stories implemented by the plurality of microservices;

extracting story feature information from the backlog tracker;

accessing code for the plurality of microservices from a code repository;

traversing the code from the code repository to generate a call-context graph, wherein the call-context graph includes information identifying calling functions and called functions in the code for the plurality of microservices;

cross-matching the actual usage information and the information in the call-context graph to generate an aggregated output, wherein the aggregated output includes information relating to the calling functions, the called functions, and actual usage of the calling and called functions of the plurality of microservices;

providing the story feature information and aggregated output to a natural language generator; and generating documentation for the microservice based application at the natural language generator using the story feature information and aggregated output.

16. The non-transitory, computer-readable storage medium of claim 15, wherein the story feature information is extracted from stories that have been implemented in the plurality of microservices to the exclusion of stories that have not been implemented in the plurality of microservices.

17. The non-transitory, computer-readable storage medium of claim 15, wherein the aggregated output excludes actual usage information relating to functions that are not traversed in during generation of the call-context graph.

18. The non-transitory, computer-readable storage medium of claim 15, wherein the usage information includes one or more electronic logs, wherein the one or more electronic logs include logged events occurring during user execution of the plurality of microservices, wherein the logged events are one or more of:

warnings about low disk space;

an operation that has been carried out;

error events; and security events.

19. The non-transitory, computer-readable storage medium of claim 15, wherein the usage information includes analytics data relating to actual usage of the plurality of microservices.

20. The non-transitory, computer-readable storage medium of claim 15, wherein the call-context graph includes one or more of:

a first array of all vertices and corresponding functions called while traversing the code; and a second array of parent functions, child functions, and number of times the child functions are called.

* * * * *